3,155,665
**4,6-DIALKYL-5,7-DIKETOTHIAZOLO[4,5-d]PYRIMI-
DINE-2-CARBOXYLIC ACID AND DERIVATIVES
THEREOF**
Elmer F. Schroeder, Chicago, Ill., assignor to G. D. Searle
& Co., Chicago, Ill., a corporation of Delaware
No Drawing. Filed Apr. 26, 1961, Ser. No. 105,541
13 Claims. (Cl. 260—256.5)

The present invention relates to novel bicyclic compounds of the thiazolo[4,5-d]pyrimidine series and, more particularly, to 4,6-dialkyl-5,7 - diketothiazolo[4,5-d]pyrimidines of the structural formula

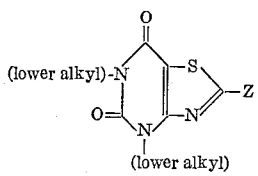

wherein Z is hydrogen or a member of the class consisting of —COOH, —COO(lower alkyl), —CONH$_2$, —CONH(lower alkyl), —CON(lower alkyl)$_2$, and —CONH(lower alkylene)OH radicals. A further object of this invention is to provide novel compounds of the structural formula

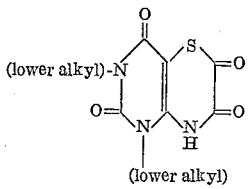

which are useful as intermediates in the manufacture of the instant thiazolo[4,5-d]pyrimidines.

The lower alkyl and lower alkylene radicals represented supra are exemplified by methyl, ethyl, propyl, butyl, pentyl, hexyl, methylene, ethylene, trimethylene, tetramethylene, pentamethylene, and the branched-chain isomers thereof.

Suitable starting materials for the manufacture of the compounds of the present invention are the 1,3-dialkyl-5-carboxymethylmercapto-6-aminouracils, described in U.S. 2,958,692. Treatment of the latter substances with a dehydrating agent such as acetic anhydride effects ring closure to afford the corresponding 5,7-dialkyl-3,6,8-triketopyrimido[5,4 - b]1,4 - thiazines of the structural formula

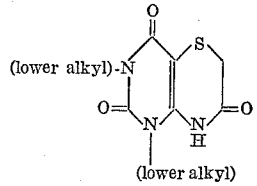

Chlorination of these bicyclic compounds, typically with sulfuryl chloride in carbon tetrachloride, affords the corresponding 2,2-dichloro derivatives, which are converted to the aforementioned novel 5,7-dialkyl-2,3,6,8-tetraketopyrimido[5,4-b]1,4-thiazines of the structural formula

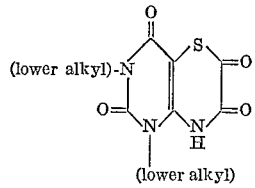

by heating in glacial acetic acid. Alternatively, the latter novel intermediates can be obtained directly by treating the aforementioned 5,7-dialkyl - 3,6,8 - triketopyrimido-[5,4-b]1,4-thiazines with sulfuryl chloride in acetic acid.

The 4,6-dialkyl-5,7-diketothiazolo[4,5-d]pyrimidines of this invention are obtained by allowing the intermediate 5,7-dialkyl-2,3,6,8-tetraketopyrimido[5,4-b]1,4 - thiazines to react with a variety of reagents. Reaction with a lower alkanol produces the 2-carbalkoxy derivatives represented by the structural formula

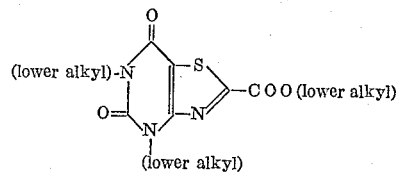

while treatment with aqueous alkali followed by acidification with a mineral acid results in the corresponding 2-carboxy compounds, and reaction with ammonia or an amine affords the 2-carboxamido or N-substituted 2-carboxamido substances. These 2-carboxy compounds can be manufactured, alternatively, by hydrolysis, typically with aqueous alkali, of the corresponding 2-carbalkoxy derivatives. Decarboxylation of the instant 2-carboxy derivatives, by heating at approximately 100–200°, results in the 4,6-dialkyl-5,7-diketothiazolo[4,5 - d]pyrimidines of this invention.

The intermediate 5,7-dialkyl-2,3,6,8-tetraketopyrimido [5,4-b]1,4-thiazines of the present invention are useful also as a result of their valuable pharmacological properties. In particular, they are hypotensive and diuretic agents.

The 4,6-dialkyl-5,7-diketothiazolo[4,5-d]-pyrimidines of this invention display valuable pharmacological properties. They are, for example, hypotensive agents. In addition, those compounds containing a hydrogen substituent at the 2-position are further characterized by diuretic and anti-inflammatory activity.

The following examples described in detail certain of the compounds illustrative of the present invention and methods which have been devised for their manufacture. However, the invention is not to be construed as limited thereby, either in spirit or in scope, since it will be apparent to those skilled in the art that many modifications, both of materials and of methods, may be practiced without departing from the purpose and intent of this disclosure. In the examples hereinafter detailed, temperatures are given in degrees centigrade (° C.) and quantities of materials in parts by weight, except as otherwise noted.

EXAMPLE 1

A mixture of 12.3 parts of 1,3-dimethyl-5-carboxymethylmercapto-6-aminouracil and 43.5 parts of acetic anhydride is heated at reflux for about 5 minutes. Complete solution first occurs, after which time a crystalline precipitate forms. The reaction mixture is heated for an additional 30 minutes on the steam bath, and the excess acetic anhydride is destroyed by the addition of 10 parts of water to the hot reaction mixture followed by an additional 100 parts of water, after which time the mixture is cooled and the crystals are collected by filtration. This crude product is washed with water, and purified by dissolution in 60 parts of water containing 2 parts of sodium hydroxide, decolorization with decolorizing carbon, and acidification with acetic acid. The crystalline precipitate which forms is collected by filtration, washed with water, and dried to afford 5,7-dimethyl-3,6,8-triketopyrimido[5, 4-b]1,4-thiazine, which melts at about 270–272°.

EXAMPLE 2

A mixture of 45.6 parts of 1-propyl-3-ethyl-5-carboxymethylmercapto-6-aminouracil and 105 parts of acetic anhydride is heated on the steam bath for about 4 hours. Cautious addition of first 20 parts of water, then 450 parts of water results in destruction of the excess acetic anhydride. The crystalline precipitate which forms on cooling is collected by filtration, washed with water, and purified by dissolution in 600 parts of water containing 6.4 parts of sodium hydroxide, decolorization of the resulting solution with decolorizing carbon, and acidification with glacial acetic acid. The precipitate which forms upon cooling is collected by filtration, washed with water, and dried. Recrystallization from ethanol produces 5-propyl-7-ethyl-3,6,8-triketopyrimido[5,4-b]1,4 - thiazine, M.P. about 186–188°.

EXAMPLE 3

A mixture of 27 parts of 5-propyl-7-ethyl-3,6,8-triketopyrimido[5,4-b]1,4-thiazine, 460 parts of carbon tetrachloride and 27 parts of sulfuryl chloride is heated at reflux for about 1½ hours. The reaction mixture is then clarified by filtration, and the filtrate is diluted with about 33 parts of hexane. The solid product which separates upon cooling is collected by filtration, washed on the filter with hexane, and dried to produce 2,2-dichloro-5-propyl-7-ethyl-3,6,8-triketopyrimido[5,4-b]1,4-thiazine as a pale yellow solid, M.P. about 145–147°.

EXAMPLE 4

The substitution of 23 parts of 5,7-dimethyl 3,6,8-triketopyrimido[5,4-b]1,4-thiazine for the 5-propyl-7-ethyl-3,6,8-triketopyrimido[5,4-b]1,4-thiazine of Example 3 affords, by the procedure therein described, 2,2-dichloro-5,7-dimethyl-3,6,8-triketopyrimido[5,4-b]1,4-thiazine.

EXAMPLE 5

*Method A.*—A mixture of 5 parts of 2,2-dichloro-5-propyl - 7 - ethyl-3,6,8-triketopyrimido[5,4-b]1,4-thiazine and 50 parts of glacial acetic acid is heated on the steam bath for about 20 minutes in a container protected from moisture of the air. To the resulting dark solution is added 15 parts of hexane, and the mixture is cooled. The precipitate which forms is removed by filtration, washed on the filter with hexane, and dried in air to give 5-propyl-7-ethyl-2,3,6,8-tetraketopyrimido[5,4-b]1,4 - triazine, as yellow crystals melting at 235–237°.

*Method B.*—A mixture of 27 parts of 5-propyl-7-ethyl-3,6,8-triketopyrimido[5,4-b]1,4-thiazine, 155 parts of glacial acetic acid and 30 parts of sulfuryl chloride is allowed to stand at room temperature for about 30 minutes, then heated at 100° for about 40 minutes. The deep red solution thus obtained is cooled to 50°, and 150 parts of hexane is added. The precipitate which forms is removed by filtration, washed on the filter with hexane, and dried in air to give 5-propyl-7-ethyl-2,3,6,8-tetraketopyrimido [5,4-b]1,4-thiazine, as yellow crystals meltting at 235–237°.

EXAMPLE 6

To a suspension of 22.7 parts of 5,7-dimethyl-3,6,8-triketopyrimido[5,4-b]1,4-triazine in 142 parts of glacial acetic acid is added 29.7 parts of sulfuryl chloride. The resulting yellowish solution is heated on the steam bath for about 45 minutes, then cooled and diluted with hexane. Further cooling of the diluted solution affords bright yellow crystals of 5,7-dimethyl-2,3,6,8-tetraketopyrimido[5,4-b]1,4-thiazine, which is collected by filtration, washed with hexane and dried. This substance displays a melting point at about 297–299° with decomposition.

The product of this example can be prepared also by the substitution of an equivalent quantity of 2,2-dichloro-5,7 - dimethyl-3,6,8-triketopyrimido[5,4-b]1,4-triazine in the process designated as method A of Example 5.

EXAMPLE 7

A suspension of 24 parts of 5-propyl-7-ethyl-2,3,6,8-tetraketopyrimido[5,4-b]1,4-thiazine in 200 parts of absolute ethanol is heated at reflux for one hour; solution is complete after about 30 minutes. The reaction mixture thus obtained is diluted with 150 parts of water, and the resulting mixture is chilled. The precipitate which forms is removed by filtration, and recrystallized from aqueous ethanol, with charcoal decolorization. The 2-carbethoxy - 4-propyl - 6-ethyl-5,7-diketothiazolo[4,5-d] pyrimidine thus prepared melts at about 81–82°.

EXAMPLE 8

A mixture of 24.1 parts of 5,7-dimethyl-2,3,6,8-tetraketopyrimido[5,4-b]1,4-thiazine and 240 parts of ethanol is heated at reflux for about 2 hours, during which time complete solution occurs. The reaction mixture is cooled for several hours to effect crystallization of 2-carbethoxy-4,6 - dimethyl-5,7-diketothiazolo[4,5-d]pyrimidine, which is collected by filtration, washed with ethanol, and dried. Recrystallization from ethanol results in the pure compound, which displays a melting point at about 115–116°.

EXAMPLE 9

Substitution of 200 parts of absolute methanol for the absolute ethanol of Example 7 gives, by the procedure therein detailed, 2-carbomethoxy-4-propyl-6-ethyl-5,7-diketothiazolo[4,5-d]pyrimidine.

EXAMPLE 10

Substitution of 24 parts of 5,7-dimethyl-2,3,6,8-tetraketopyrimido[5,4-b]1,4-thiazine and 200 parts of absolute methanol for the absolute ethanol of Example 7 gives, by the procedure therein detailed, 2-carbomethoxy-4,6-dimethyl-5,7-diketothiazolo[4,5-d]pyrimidine.

EXAMPLE 11

*Method A.*—A mixture of 57 parts of 5-propyl-7-ethyl-2,3,6,8-tetraketopyrimido[5,4-b]1,4-thiazine, 24 parts of sodium hydroxide and 600 parts of water is allowed to stand at room temperature for about 30 minutes. At the end of this time the reaction mixture is acidified with hydrochloric acid, whereupon an oil separates. The oil solidifies on standing, and the solid material thus obtained is removed by filtration, washed on the filter with water, and dried in air, first at room temperature, and then at 80°. The 2 - carboxy-4-propyl-6-ethyl-5,7-diketothiazolo [4,5-d]pyrimidine thus obtained melts at 130–132°, with effervescence.

*Method B.*—A mixture of 94 parts of 2-carbethoxy-4-propyl - 6-ethyl - 5,7-diketothiazolo[4,5-d]pyrimidine, 18 parts of sodium hydroxide and 1000 parts of water is stirred at room temperature for about 30 minutes, and then acidified with hydrochloric acid. An oil separates, which solidifies readily. The solid material thus formed is removed by filtration, washed on the filter with water, and dried in air, first at room temperature and then at 80°. The 2-carboxy-4-propyl-6-ethyl-5,7-diketothiazolo-[4,5-d]pyrimidine thus obtained melts at 130–132°.

EXAMPLE 12

A solution of 24.1 parts of 5,7-dimethyl-2,3,6,8-tetraketopyrimido[5,4-b]1,4-thiazine in 250 parts of water containing 8 parts of sodium hydroxide is allowed to stand at room temperature for about 30 minutes, then is acidified with about 20 parts of concentrated hydrochloric acid. The precipitate which forms is collected by filtration, washed with water, and dried to produce 2-carboxy-4,6 - dimethyl-5,7-diketothiazolo[4,5-d]pyrimidine, M.P. about 219–221°.

EXAMPLE 13

28 parts of 2-carboxy-4-propyl-6-ethyl-5,7-diketothiazolo[4,5-d]pyrimidine is placed in a flask, which is then heated to 125° for about 20 minutes; vigorous evolution of carbon dioxide is noted. The residual oil solidifies on cooling to give 4-propyl-6-ethyl-5,7-diketothiazolo[4,5-d]pyrimidine, melting at 76–78°.

EXAMPLE 14

A flask containing 3 parts of 2-carboxy-4,6-dimethyl-5,7-diketothiazolo[4,5-d]pyrimidine is immersed in an oil bath and heated gradually, over a 30 minute period to about 170°. When the evolution of carbon dioxide ceases, the residual dark liquid is cooled to afford the solid crude product. Recrystallization from ethanol, containing decolorizing carbon, affords colorless crystals of 4,6-dimethyl-5,7-diketothiazolo[4,5-d]pyrimidine, which displays a melting point at about 223–224°.

EXAMPLE 15

*Method A.*—To 10 parts of 5-propyl-7-ethyl-2,3,6,8-tetraketopyrimido[5,4-b]1,4-thiazine is added 50 parts of concentrated ammonium hydroxide. Solution occurs immediately, and evolution of heat is noted. The mixture thus obtained is allowed to stand at room temperature for about 15 minutes, and then cooled. The precipitate which forms is removed by filtration, washed with water, dried at about 80°, and recrystallized from ethanol to give 2 - carboxamido - 4 - propyl - 6 - ethyl - 5,7 - diketothiazolo[4,5-d]pyrimidine, melting at 186–188°.

*Method B.*—To a solution of 5 parts of 2-carbethoxy-4 - propyl - 6 - ethyl - 5,7 - diketothiazolo[4,5-d]pyrimidine in 50 parts of ethanol is added 50 parts of concentrated ammonium hydroxide, and the resulting mixture is allowed to stand at room temperature for about 30 minutes. At the end of this time the reaction mixture is heated for about 5 minutes on the steam bath, diluted with 50 parts of water, and cooled. The precipitate which forms is removed by filtration, washed with water, and dried at 80°. The 2-carboxamido-4-propyl-6-ethyl-5,7-diketothiazolo[4,5-d]pyrimidine thus obtained melts at 186–188°.

EXAMPLE 16

Substitution of 10 parts of 5,7-dimethyl-2,3,6,8-tetraketopyrimido[5,4-b]1,4-thiazine for the 5-propyl-7-ethyl-2,3,6,8-tetraketopyrimido[5,4-b]1,4-thiazine of Method A, Example 15, gives, by the procedure therein detailed, 2 - carboxamido - 4,6 - dimethyl - 5,7 - diketothiazolo-[4,5-d]pyrimidine.

EXAMPLE 17

To a suspension of 30 parts of 5-propyl-7-ethyl-2,3,6,8-tetraketopyrimido[5,4-b]1,4-thiazine in 75 parts of water is added 75 parts of 25% aqueous methylamine. Evolution of heat is noted, and the resultant homogeneous mixture is allowed to stand at room temperature for about one hour. At the end of this time, the reaction mixture is cooled, and the resultant precipitate is removed by filtration, washed with water, and dried in air to give 2-(N-methylcarboxamido)-4-propyl-6-ethyl-5,7-diketothiazolo[4,5-d]pyrimidine, melting at 179–181°.

EXAMPLE 18

Substitution of 30 parts of 5,7-dimethyl-2,3,6,8-tetraketopyrimido[5,4-b]1,4-thiazine for the 5-propyl-7-ethyl-2,3,6,8-tetraketopyrimido[5,4-b]1,4-thiazine of Example 17 gives, by the procedure therein detailed, 2-(N-methyl - carboxamido) - 4,6 - dimethyl - 5,7 - diketothiazolo[4,5-d]pyrimidine.

EXAMPLE 19

Substitution of 75 parts of 25% aqueous ethylamine for the 25% aqueous methylamine of Example 17 gives, by the procedure therein detailed, 2-(N-ethylcarboxamido) - 4 - propyl - 6 - ethyl - 5,7 - diketothiazolo[4,5-d]-pyrimidine.

EXAMPLE 20

Substitution of 30 parts of 5,7-dimethyl-2,3,6,8-tetraketopyrimido[5,4-b]1,4-thiazine for the 5-propyl-7-ethyl-2,3,6,8-tetraketopyrimido[5,4-b]1,4-thiazine and 75 parts of 25% aqueous ethylamine for the 25% aqueous methylamine of Example 17 gives, by the procedure therein detailed, 2 - (N - ethylcarboxamido) - 4,6 - dimethyl-5,7 - diketothiazolo[4,5 - d]pyrimidine.

EXAMPLE 21

*Method A.*—To a suspension of 30 parts of 5-propyl-7-ethyl-2,3,6,8-tetraketopyrimido[5,4-b]1,4-thiazine in 75 parts of water is added 75 parts of 25% aqueous dimethylamine; complete solution occurs on stirring, and evolution of heat is noted. The mixture thus obtained is allowed to stand for about 1½ hours at room temperature and then cooled. The precipitate which forms is removed by filtration, washed with water, and dried at 80° to give 2 - (N,N - dimethylcarboxamido) - 4 - propyl - 6 - ethyl-5,7-diketothiazolo[4,5-d]pyrimidine, melting at 110–112°.

*Method B.*—To a solution of 5 parts of 2-carbethoxy-4 - propyl - 6 - ethyl - 5,7 - diketothiazolo[4,5 - d] - pyrimidine in 40 parts of ethanol is added a solution of 4 parts of dimethylamine in 40 parts of water, and the resulting reaction mixture is allowed to stand at room temperature for about 2 hours. At the end of this time 80 parts of water is added, and the mixture thus obtained is chilled. The precipitate which forms is removed by filtration, washed with water, and dried at 80° to give 2 - (N,N - dimethylcarboxamido) - 4 - propyl - 6 - ethyl-5,7 - diketothiazolo[4,5 - d]pyrimidine, melting at 110–112°.

EXAMPLE 22

Substitution of 30 parts of 5,7-dimethyl-2,3,6,8-tetraketopyrimido[5,4-b]1,4-thiazine for the 5-propyl-7-ethyl-2,3,6,8-tetraketopyrimido[5,4-b]1,4-thiazine of Method A, Example 21, gives, by the procedure therein detailed, 2 - (N,N - dimethylcarboxamido) - 4,6 - dimethyl - 5,7-diketothiazolo[4,5-d]pyrimidine.

EXAMPLE 23

Substitution of 75 parts of 25% aqueous diethylamine for the 25% aqueous dimethylamine of Method A, Example 21, gives, by the procedure therein detailed, 2-(N,N - diethylcarboxamido) - 4 - propyl - 6 - ethyl - 5,7 - diketothiazolo[4,5-d]pyrimidine.

EXAMPLE 24

Substitution of 30 parts of 5,7-dimethyl-2,3,6,8-tetraketopyrimido[5,4-b]1,4-thiazine for the 5-propyl-7-ethyl-2,3,6,8-tetraketopyrimido[5,4-b]1,4-thiazine and 75 parts of 25% aqueous diethylamine for the dimethylamine of Method A, Example 21, gives, by the procedure therein detailed, 2-(N,N-diethylcarboxamido)-4,6-dimethyl-5,7-diketothiazolo[4,5-d]pyrimidine.

EXAMPLE 25

To a suspension of 2.83 parts of 5-propyl-7-ethyl-2,3,6,8-tetraketopyrimido[5,4-b]1,4-thiazine in 5 parts of water is added 0.915 part of β-hydroxyethylamine. The resulting solution is stored at room temperature for about 30 minutes, during which time the oil, which separates initially, crystallizes. This mixture is cooled, and the crystals are collected by filtration, washed with water, then recrystallized from aqueous ethanol and dried at about 80° to afford 2-[N-(β-hydroxyethyl)carboxamido]-4-propyl-6-ethyl-5,7-diketothiazolo[4,5-d]pyrimidine, M.P. about 125–127°.

EXAMPLE 26

The substitution of 1.12 parts of γ-hydroxypropylamine in the process of Example 25 results in 2-[N-(γ-hydroxypropyl)carboxamido]-4-propyl-6-ethyl-5,7-diketothiazolo-[4,5-d]pyrimidine.

What is claimed is:
1. A compound of the formula

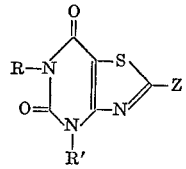

wherein R and R' are lower alkyl and Z is a $$-\overset{O}{\underset{\|}{C}}-X$$

group, X representing a radical selected from the group consisting of hydroxy, lower alkoxy, amino, (lower alkyl)-amino, di-lower alkyl)amino, and hydroxy(lower alkylene)amino.

2. A compound of the formula

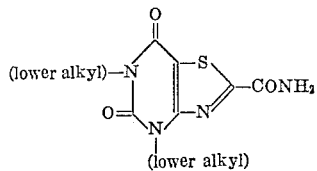

3. A compound of the formula

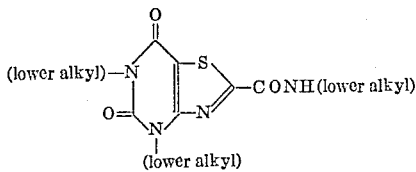

4. A compound of the formula

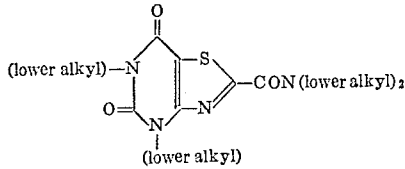

5. A compound of the formula

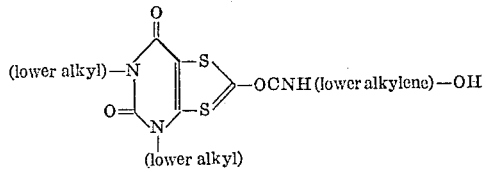

6. 2 - [N - (β - hydroxyethyl)carboxamido]-4-propyl-6-ethyl-5,7-diketothiazolo[4,5-d]pyrimidine.

7. 2-carboxy-4-propyl-6-ethyl-5,7-diketothiazolo[4,5-d]-pyrimidine.

8. 2-carbethoxy-4-propyl-6-ethyl - 5,7 - diketothiazolo-[4,5-d]pyrimidine.

9. 2 - carboxy - 4,6-dimethyl-5,7-diketothiazolo[4,5-d]-pyrimidine.

10. 2-carboxamido-4-propyl-6-ethyl-5,7- diketothiazolo-[4,5-d]pyrimidine.

11. 2-(N-methylcarboxamido)-4-propyl-6-ethyl - 5,7- diketothiazolo[4,5-d]pyrimidine.

12. 2-carbethoxy-4,6-dimethyl-5,7-diketothiazolo[4,5-d]-pyrimidine.

13. 2-(N,N-dimethylcarboxamido)-4-propyl-6-ethyl-5,7-diketothiazolo[4,5-d]pyrimidine.

References Cited in the file of this patent
UNITED STATES PATENTS

| | | |
|---|---|---|
| 2,651,630 | Downey | Sept. 8, 1953 |
| 2,799,676 | Maxion | July 16, 1957 |
| 2,863,864 | Kirchner | Dec. 9, 1958 |
| 2,933,498 | Hitchings et al. | Apr. 19, 1960 |

OTHER REFERENCES

Erlenmeyer et al.: Helv. Chim. Acta., vol. 30, pp. 585–592 (1947).